May 13, 1952   E. L. BARCUS   2,596,834
DIRECTION SIGNAL SWITCH
Filed July 14, 1949   2 SHEETS—SHEET 1

Inventor
Edward L. Barcus
By
Spencer, Willits, Helmig & Baillio
Attorneys

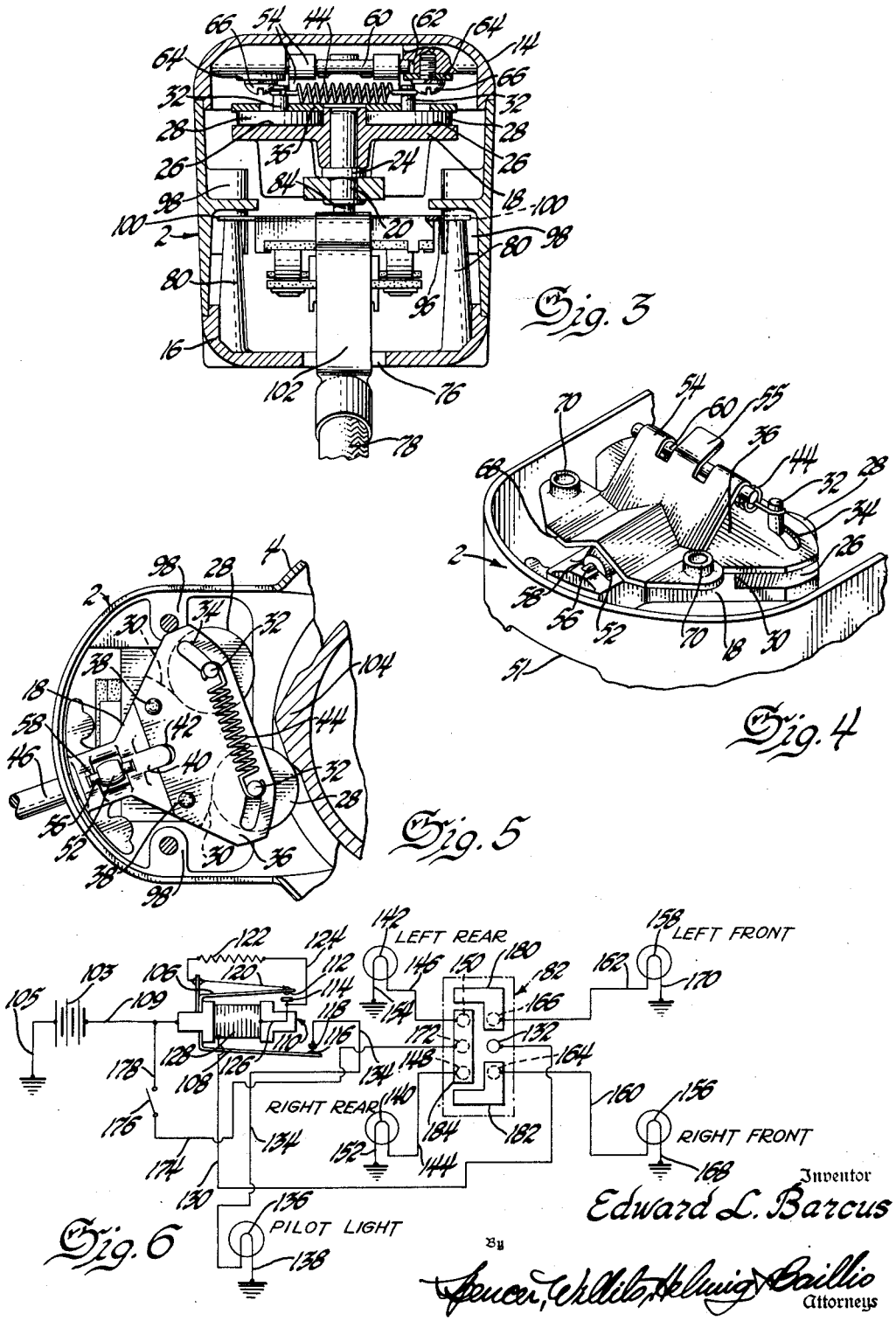

Patented May 13, 1952

2,596,834

UNITED STATES PATENT OFFICE 2,596,834

DIRECTION SIGNAL SWITCH

Edward L. Barcus, Anderson, Ind., assignor to General Motors Corporation, Detroit, Mich., a corporation of Delaware Application July 14, 1949, Serial No. 104,655

13 Claims. (Cl. 200—59)

The present invention relates to motor vehicle direction signalling systems comprising a plurality of signalling circuits and more particularly to switches adapted to be manually set to control the system circuits and automatically reset by the cooperative action of the steering mechanism. The invention resides in an improved switch construction for such systems and has for its object the provision of a switch construction characterized by simplicity, economy of construction, reliability and ease of assembly and disassembly.

Other objects and advantages of the invention will become apparent as the following description proceeds and the features of novelty which characterize the invention will be pointed out with particularity in the claims annexed to and forming a part of this specification.

Figure 1:
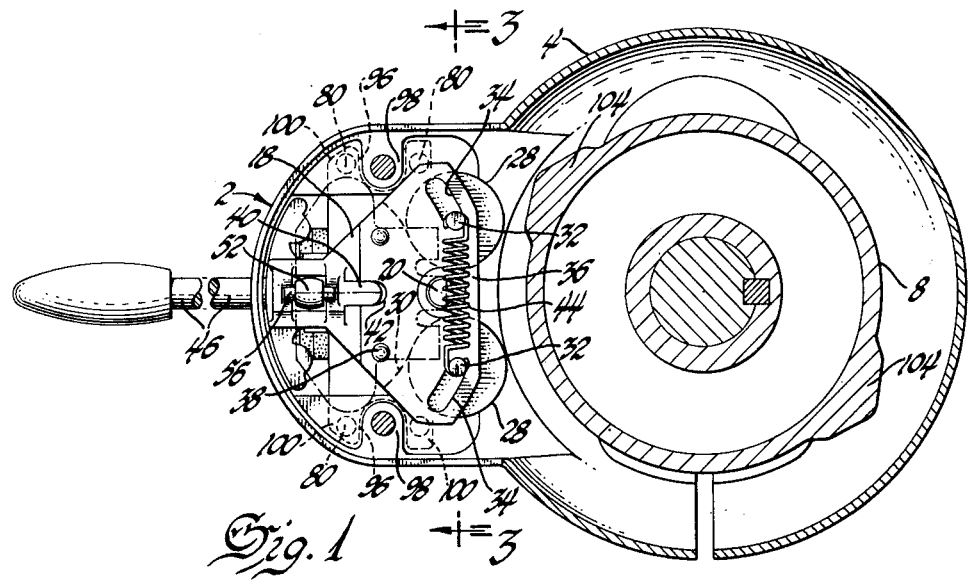
Figure 2:
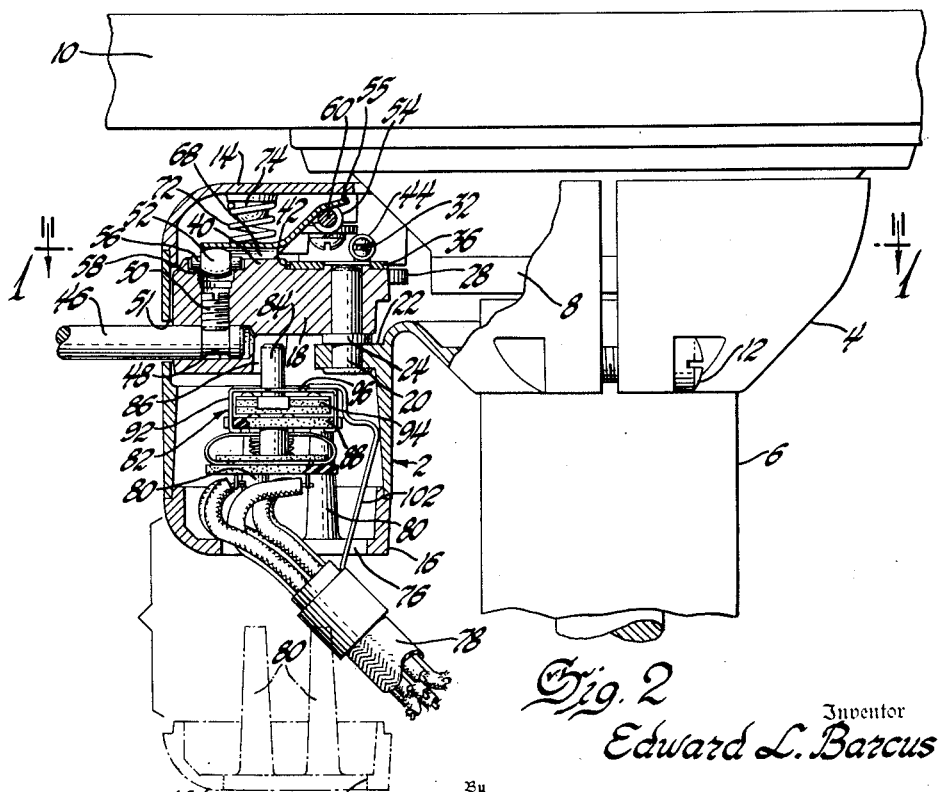

For a better understanding of the invention, reference may be had to the accompanying drawings in which Figure 1 is a plan view with parts broken away and parts in section taken along line 1—1 of Figure 2 illustrating a direction signalling switch embodying the present invention; Figure 2 is an elevational view of the switch shown mounted on the steering column of a vehicle with parts broken away, parts in section and the lower cover illustrated in dash and dot lines before assembly; Figure 3 is a view taken along the line 3—3 of Figure 1; Figure 4 is a fragmentary perspective view illustrating the top of the switch mechanism; Figure 5 is a fragmentary plan view illustrating the switch mechanism in one of its operative positions and Figure 6 is a diagrammatic view of the direction signalling system.

Referring now to the drawings and particularly to Figures 1, 2, 3, 4 and 5, there is illustrated a switch construction embodying the present invention in which the operating mechanism is enclosed in a housing adapted to be attached to the steering column of a vehicle adjacent the steering wheel. The housing comprises a die cast body member 2 having a split ring clamp 4 integral therewith which surrounds the steering column 6 and is clamped thereto adjacent the hub 8 of the steering wheel 10 by a screw threaded member 12. Top and bottom cover members 14 and 16 respectively provide for enclosing the operating mechanism in the body member 2 and cooperate with the member to retain parts of the mechanism in assembled relation.

Positioned within the body member 2 is a triangularly shaped pivot plate 18 adapted for limited rotary movement to actuate a switch for connecting the respective signalling circuits to a source of current which is generally the vehicle battery. The pivot plate 18 is mounted on an upwardly extending pin 20 secured in a flange 22 extending inwardly from the inner wall of the body member 2. The pin is provided with an annular flange 24 and is secured in its position in the housing flange 22 by peening over the lower end of the pin as shown. The upper surface of the pivot plate 18 is provided with a pair of recessed ledges 26 adjacent the angular extremities for receiving a pair of circular dogs 28. To provide means for positioning the circular dogs and guiding their limited travel the upwardly extending walls 30 formed by the recessed ledges are arcuate. As shown the walls 30 extend upwardly from the recessed ledges 26 and across the two ends of the pivot plate 18 carrying the dogs 28. The walls beginning at one side of the pivot plate have adjacent portions formed on a radius of curvature substantially the same as that of the peripheral surface of the dogs 28 and extend on a reversed radius of curvature to opposite sides of the pivot plate. There is thus formed adjacent wall pockets adapted to receive the dogs in their normal positions with engagement of the complementary surfaces through about one-third of the circumference of the dogs. The wall portions extending from the pocket portions and formed on a reverse curvature provide a hump which restrains movement of the disks particularly when the disks are moved into the orbit of the dog ears to effect a right or left turn signal and subsequent movement of the mechanism to a neutral position. Such a wall curvature is particularly desirable since it acts when the mechanism is in either of its operative positions to prevent sliding of the disks out of the orbit of the dog ears when the dog ears are acting on the dog to return the mechanism to its neutral position. The circular dogs 28 are provided with upwardly extending axial pins 32 which project through oblong arcuate apertures 34 provided in a retainer plate 36 fastened to the top surface of the pivot plate by peened rivets 38 or other securing means such as screws. The retainer plate also serves to secure the pivot plate and circular dogs in assembled relationship. To provide for positioning the retainer plate 36 a dog 40 integral with the pivot plate 18 engages a keyway 42 in the retainer plate. The circular disks 28 are yieldingly urged toward each other in the recessed ledges in the pivot plate by a spring 44 whose ends engage cooperating grooves adjacent the ends of the axial pins 32. Extending from the other angular extremity of the pivot plate 18 is an operating lever 46 which is secured in a bore 48 in the pivot plate by a screw 50 and extends through an oblong aperture 51 in the wall of the body member 2. Mounted in the pivot plate 18 above the screw 50 is a detent roller 52 which cooperates with a detent plate 54 to position the lever and pivot plate in its neutral and extreme operating positions. The roller is provided with reduced axial extending portions 56 which are journaled in recesses 58 in the pivot plate.

The detent plate 54 is mounted on a shaft 60 the ends of which are positioned in recesses 62 in the top cover member 14. The shaft 60 is retained in position in the cover member by washers 64 and screws 66. As shown, the detent plate is provided with an undulated portion 68 which cooperates with the roller 52 to position the pivot plate. Adjacent the ends of the undulated portion there are a pair of upwardly extending cylindrical projections 70 over which coil springs 72 are placed for yieldingly urging the undulated portion 68 into engagement with the roller 52. The other ends of springs 72 are positioned over projecting knobs 74 integral with the top cover 14. Adjacent the shaft 60, the detent plate 54 is provided with a flange 55 which is adapted to engage the inner surface of the cover member 14 when it is removed from the body member 2 thereby preventing the ends of springs 72 from disengaging projections 70 and knobs 74. With this arrangement the top cover 14, detent plate 54 and springs 72 form a subassembly which covers the body member 2 and provides the detent mechanism for cooperation with the roller 52.

The lower cover member 16 is provided with an aperture 76 for receiving the cable 78 connecting the various signalling circuits and upwardly extending columns 80 which support a switch 82 in position in the body member 2 for engagement of the switch operating arm 84 with a cooperating recess 86 in the bottom of the pivot plate 18. The switch 82 is a type commonly used with direction signal operating mechanisms and comprises a terminal plate 88 of insulating material carrying a plurality of contact terminals connected to the leads of cable 78. The terminal plate forms one side of an enclosure 92 in which there is positioned a sliding block 94 of insulating material carrying bridging bars for bridging the terminal contacts of the terminal plate 88 to energize and deenergize circuits of the signalling system. Connected to and extending upwardly from the sliding block 94 through an aperture in the enclosure 92 is the operating arm 84 of the switch. The enclosure 92 is formed with extending flanges adjacent its ends which are provided with a keyway 96 for engagement with guiding projections 98 extending from the inner wall at each side of the body member 2 to guide the positioning of the switch. Adjacent the keyways are projections 100 which engage the tops of the columns 80 for supporting the switch in the body member 2. To provide means for supporting the cable without a separating stress between the cable leads and contact terminals a metal clip 102 is attached to the cable adjacent the leads and extends through aperture 76 into the body member 2 where its upper end is formed to engage the switch housing and the side wall of the body member to support the cable as shown. As with the upper cover member 14 the lower cover member 16, switch 82 and cable 78 form a subassembly which provides a cover for the lower part of the body member 2 and when assembled with the body member supports the switch for engagement with the operating mechanism. Such an arrangement is particularly desirable for low cost manufacturing and ease of assembly and disassembly in making any necessary repairs.

In operation the lever 46 is moved manually clockwise or counterclockwise to its extreme position to actuate the switch and connect a circuit indicating a turn in that direction. It simultaneously rotates the pivot plate assembly to place one of the dogs 28 into the path of a dog ear 104 formed on the peripheral surface of hub 8 of steering wheel 10. The dog ears 104 are formed with inclined ramps at either side of their crests to provide for a more gradual movement of the dogs 28. A corresponding rotating movement of the steering wheel causes the dog ear 104 to engage the dog 28 which is in its path forcing the dog to slide on the ledge 26 against the pressure of spring 44 until it is clear of the dog ear. The movement of the dog is of course guided by the arcuate slots 34 and the dog pins 32. The dog ear 104 having cleared the dog 28, it is returned to its normal position by the spring 44. Upon reversal of rotation of the steering wheel 10 to straighten the path of the vehicle, the dog ear 104 engages the dog 28 forcing the dog and pivot plate assembly to rotate angularly in a direction opposite to the angular direction of the steering wheel until the dog 28 is clear of the path of the dog ear 104. This movement places the mechanism again in its neutral position determined by the roller 52 and detent plate 54.

To provide a visual indication of the direction of turn contemplated by the operator of a vehicle the contact terminals of switch 82 are connected in a plurality of circuits of a signalling system including right and left front and rear signalling lamps. As shown in Figure 6 of the drawings the system comprises a battery 103 having one terminal connected to ground by a conductor 105 and the other terminal connected to the hinged armatures 106 and 108 of a solenoid operated flasher 110 by conductor 109. The armature 106 is provided with a contact 112 which is normally out of engagement with a fixed contact 114. The armature 108 is provided with a contact 116 which is also normally out of engagement with a fixed contact 118. Armature 106 and contact 112 are connected by a conductor 120 of predetermined resistance which when not carrying current urges the armature 106 and contact 112 to a position where engagement of contacts 112 and 114 is broken. Conductor 120 is connected to a resistor 122 which has its opposite terminal connected to the fixed contact 114 by a conductor 124. Contact 114 is connected by a conductor 126 to one terminal of the solenoid coil 128. The other end of the solenoid coil is connected by a conductor 130 to contact terminal 132 of the switch 82. Contact 118 is connected by a conductor 134 to the filament 136 of a pilot light mounted on the dash panel of the vehicle with the other end of the filament being connected by a conductor 138 to ground.

The right and left rear signalling lamps of the system have one side of their filaments 140 and 142 respectively connected by conductors 144 and 146 to contact terminals 148 and 150 of the switch 82 and the other side of the filaments connected to ground by conductors 152 and 154. The right and left front signalling lamps of the system have one side of their filaments 156 and 158 respectively connected by conductors 160 and 162 to terminals 164 and 166 of the switch 82 and the other side of filaments 156 and 158 are connected to ground by conductors 168 and 170. The remaining terminal 172 of switch 82 is connected by a conductor 174 to one terminal of a normally open switch 176 closed by operation of the brake pedal of the vehicle. The other terminal of switch 176 is connected by a conductor 178 to the wire 109. As heretofore described the switch 82 is provided with a sliding plate 94 which carries bridging contacts 180, 182 and 184 for providing energization of the respective lamp filaments in accordance with a manual operation of the lever arm 46.

In operation the neutral position of the switch 82 and switch operating mechanism is as shown in Figure 6 with contact terminals 148, 150 and 172 bridged by the bridging contact bar 184. With the switch 82 in this position the filaments 140 and 142 of the respective right and left rear signalling lamps may be energized by the operation of the vehicle brake pedal and simultaneous closure of switch 176 to indicate to a following vehicle the intention of braking the vehicle or coming to a stop. Current is carried to filaments 140 and 142 from the battery 103 through conductors 109 and 178, brake switch 176; conductor 174, terminal contact 172, bridging contact 184 and conductors 144 and 146. To indicate a left turn the operating lever 46 of the switch operating mechanism is moved counterclockwise to its extreme position simultaneously actuating the switch arm 84 causing bridging contact 180 of switch 82 to bridge terminal contacts 132, 150 and 166 and bridging contact 184 to shift, unbridging contact terminal 150 but retaining bridging engagement with contact terminals 148 and 172 of switch 82. Bridging contact 182 is correspondingly moved out of engagement with terminal contact 164. With this switching arrangement a circuit is completed from the battery 103 to the left front and rear filaments 142 and 158 through conductor 109, armature 106, hot wire resistance conductor 120, resistor 122, conductors 124 and 126, solenoid coil 128, conductor 130, bridging contact 180, and conductors 146 and 162. Current passing through the hot wire resistor 120 causes it to heat and simultaneously expand permitting the magnetic force of solenoid coil 128 to attract armature 106 closing contact 112 on contact 114. This by-passes hot wire 120 and resistor 122 permitting sufficient current to pass through the solenoid coil 128 to attract armature 108 and close contact 116 on contact 118 completing a circuit from the battery 103, through conductors 109, armature 108, conductor 134 to the filament 136 to energize the pilot light. With contact 112 of armature 106 closed on contact 114 by-passing hot wire 120 and 122, sufficient current passes in the aforementioned circuits to the left front and rear filaments 142 and 158 to cause them to glow providing a signal light. As the by-passed hot wire cools it contracts urging the armature 106 to break the contact engagement between contacts 112 and 114 thereby placing resistor 122 back in the circuit preventing sufficient current flow to cause illumination by current flow in filaments 142 and 158. With the flasher 110 in the circuits and operating as described the left front and rear filaments provide a flashing signal with the pilot light being illuminated during each period that sufficient current passes in the circuit of filaments 142 and 158 to cause them to become an illuminating source. If it is desired to brake the vehicle to a stop switch 176 is closed completing circuits from the battery 103 through conductor 178, switch 176 conductor 174 bridging contact 184, conductor 144 to filament 140. The filament 140 will then receive a steady flow of current from the battery to provide a constant source of illumination for the right rear lamp, while the left front and rear lamp will be alternately flashed on and off by the action of the flasher 110.

To indicate a right turn the operating lever is moved clockwise and a similar circuit condition exists except that the switch 82 has the bridging contact 182 bridging terminal contacts 132, 164 and 148 to provide for the intermittent flashing of the right front and rear lamp and bridging contact 184 engages contacts 150 and 172 while unbridging contact 148. Consequently the right front and rear lamps will be subject to intermittent flashing and if the brake switch 178 is closed the left rear lamp filament will be subject to a constant flow of current and provide a steady glow signal.

While the embodiment of the present invention as herein disclosed, constitutes a preferred form, it is to be understood that other forms might be adopted all coming within the scope of the claims which follow.

What I claim as new and desire to secure by Letters Patent of the United States is:

1. A direction signal switch for automotive vehicles adapted to be mounted adjacent the steering wheel thereof for manual operation from a neutral to an indicating position and for automatic operation to said neutral position from said indicating position in response to rotation of said steering wheel comprising a housing with upper and lower openings therein, a triangular pivot plate mounted for limited rotary movement therein, a circular dog slidably mounted at each of two ends of said pivot plate for movement in directions outwardly along paths diverging from the center of radius of said steering wheel, axial pins extending upwardly from one side of said dogs, a spring connecting the ends of said pins and yieldingly urging said dogs toward each other, an operating arm attached to and extending outwardly from said pivot plate through an aperture in the wall of said housing for rotating said pivot plate in either a clockwise or counterclockwise direction to place one of said dogs in the path of a dog ear associated with said steering wheel, detent means for indexing said pivot plate in either its neutral or operating positions, a double throw switch having its operating arm in engagement with said pivot plate for actuation thereby and cover plates for said upper and lower openings of said housing.

2. A direction signal switch for automotive vehicles adapted to be mounted adjacent the steering wheel thereof for manual operation from a neutral to an indicating position and for automatic operation to said neutral position from said indicating position in response to rotation of said steering wheel comprising a housing having upper and lower openings therein, a pivot plate mounted for limited rotary movement in said housing, said pivot plate having slidably mounted thereon a pair of spaced circular dogs yieldingly urged toward each other said dogs being movable in directions outwardly along paths diverging from the center of rotation of said steering wheel and adapted upon rotation of said pivot plate to be separately moved into the path of a dog ear associated with said steering wheel, an operating arm attached to and extending outwardly from said pivot plate and through said housing wall, a detent roller journaled in said pivot plate, a cover for said upper opening, a detent plate pivotally mounted on said cover and yieldingly urged into engagement with said detent roller, said cover and detent plate forming a subassembly of said signal switch, and a double throw switch mounted in said housing with its operating arm in engagement with said pivot plate for actuation thereby.

3. A direction signal switch for automotive vehicles adapted to be mounted adjacent the steering wheel thereof for manual operation from a neutral to an indicating position and for automatic operation to said neutral position from said indicating position in response to rotation of said steering wheel comprising a housing having upper and lower openings therein, a pivot plate mounted for limited rotary movement in said housing, said pivot plate having slidably mounted thereon a pair of spaced circular dogs yieldingly urged toward each other said dogs being movable in directions outwardly along paths diverging from the center of rotation of said steering wheel and adapted upon rotation of said pivot plate to be separately moved into the path of a dog ear attached to said steering wheel, an operating arm attached to and extending outwardly from said pivot plate and through the wall of said housing, detent means for indexing said pivot plate in either its neutral or operating positions, a top cover for said upper opening, a bottom cover for said lower opening, said bottom cover having upwardly extending columns for supporting a switch, and a double throw switch mounted on said columns with its operating arm extending into a recessed slot in said pivot plate, said bottom cover and switch forming a subassembly of said signal switch.

4. A direction signal switch for automotive vehicles adapted to be mounted adjacent the steering wheel thereof for manual operation from a neutral position to an indicating position and for automatic operation to said neutral position from said indicating position in response to rotation of said steering wheel comprising a housing having upper and lower openings therein, a pivot plate mounted for limited rotary movement in said housing, said pivot plate having slidably mounted thereon a pair of spaced circular dogs, a spring yieldingly urging said dogs toward each other said dogs being movable in directions outwardly along paths diverging from the center of rotation of said steering wheel and adapted upon rotation of said pivot plate to be separately moved into the path of a dog ear associated with said steering wheel, an operating arm attached to and extending outwardly of said pivot plate through said housing wall, a detent roller carried by said pivot plate, a cover for said upper opening having pivotally mounted thereon a detent plate yieldingly urged into engagement with said detent roller, and a cover for said lower opening, said cover having mounted thereon a double throw switch having an operating arm in engagement with said pivot plate.

5. A direction signal switch for automotive vehicles adapted to be mounted adjacent the steering wheel thereof for manual operation from a neutral position to an indicating position and for automatic operation to said neutral positions from said indicating position in response to rotation of said steering wheel comprising a housing having upper and lower openings therein, a triangular pivot plate mounted for limited rotary movement in said housing, said pivot plate having recessed ledges extending across outer ends thereof and terminating in laterally extending undulated walls with adjacent portions forming pockets, a pair of circular dogs slidably mounted on said ledges and movable in directions outwardly along paths diverging from the center of rotation of said steering wheel, said dogs having axial pins extending upwardly from one side thereof, a retainer plate secured to said pivot plate to form channels for said dogs, said retainer plate having oblong apertures therein for receiving said pins, a spring connecting the ends of said pins for yieldingly urging said dogs toward each other and into said pockets, an arm attached thereto and extending outwardly of one end of said pivot plate through an aperture in the wall of said housing, a detent roller journaled in said pivot plate adjacent said arm, a top cover for said upper opening, said cover having a detent plate pivotally mounted thereon and yieldingly urged into engagement with said detent roller, and a bottom cover for said lower opening, said cover having mounted thereon a double throw switch with an operating arm extending into a recessed slot in said pivot plate for actuation thereby.

6. A direction signal switch for automotive vehicles adapted to be mounted adjacent the steering wheel thereof for manual operation from a neutral to an indicating position and for automatic return to said neutral position from said indicating position in response to rotation of said steering wheel comprising a housing having upper and lower openings therein, a triangular pivot plate mounted for limited rotary movement in said housing, said pivot plate having recessed ledges extending across outer ends thereof and terminating in laterally extending undulated walls with adjacent portions forming pockets, a pair of circular dogs slidably mounted on said ledges and movable in directions outwardly along paths diverging from the center of rotation of said steering wheel, said dogs having axial pins extending from one side thereof, a retainer plate secured to said pivot plate to form channels for said dogs, said retainer plate having oblong apertures therein for receiving said axial pins, a spring connecting the ends of said pins for yieldingly urging said dogs toward each other and into said pockets, an operating arm attached to and extending outwardly of one end of said pivot plate through an aperture in the wall of said housing, detent means for indexing said pivot plate in its neutral or operating positions, a double throw switch mounted in said housing with its operating arm in engagement with said pivot plate and cover members for said upper and lower openings in said housing.

7. In an automotive vehicle direction signaling system adapted for mounting adjacent a steering wheel provided with an engageable element movable in a circular path, a manually operable lever pivotally mounted adjacent said element, spaced dogs slidably mounted on said lever for movement in directions outwardly along paths diverging from the center of radius of circular movement of said element, a spring yieldingly urging said dogs toward each other, said lever and dogs being movable in a clockwise of counterclockwise direction to place one of said dogs in the path of said element, said element being adapted when moved in a direction corresponding to the clockwise or counterclockwise movement of said lever and dogs to move the dog outwardly against the pressure of said spring until said dog has cleared said engageable element and when moved in a direction opposite to said clockwise or counterclockwise movement of said lever and dogs to engage said dog and rotate said dog and lever in a rotary direction corresponding to the rotary direction of said element until said dog has been moved out of the path of said element by the rotation of said lever.

8. In a vehicle direction signaling device, a housing comprising a body member having a plurality of openings and adapted to support a switch operating mechanism therein, a first cover subassembly mounted in one of said openings, said subassembly comprising a cover plate, a detent plate pivotally attached to the inner wall of said cover plate, said detent plate having an undulated portion for engaging indexing means on said mechanism to index said mechanism in a plurality of positions, means positioned between said cover plate and said detent plate to yieldingly urge said detent plate outwardly from said cover plate to engage said indexing means and a second cover subassembly mounted in another of said openings, said second cover assembly comprising a cover plate having a plurality of spaced supporting columns extending therefrom and a unitary switch assembly positioned in the space between said columns and supported thereby with its operating arm extending outwardly therefrom into a position for engagement with said mechanism to be actuated thereby.

9. In a vehicle direction signaling device, a housing comprising a body member having a plurality of openings and adapted to support a switch operating mechanism therein and a cover subassembly mounted in one of said openings, said cover subassembly comprising a cover plate, a detent plate pivotally attached to the inner wall of said cover plate, said detent plate having an undulated portion for engaging indexing means on said mechanism to index said mechanism in a plurality of positions and means positioned between said cover plate and said detent plate to yieldingly urge said detent plate outwardly from said cover plate to engage said indexing means.

10. In a vehicle direction signaling device, a housing comprising a body member having a plurality of openings and adapted to support a switch operating mechanism therein and a cover subassembly mounted in one of said openings, said cover subassembly comprising a cover plate having a plurality of spaced supporting columns extending therefrom and a unitary switch assembly positioned in the space between said columns and supported thereby with its operating arm extending outwardly therefrom into a position for engagement with said mechanism to be actuated thereby.

11. In a vehicle direction signaling device, a housing adapted to support a switch operating mechanism, said housing having oppositely disposed openings therein and a cover subassembly positioned in one of said openings, said subassembly comprising a cover plate having a projection extending from the inner wall thereof, a detent plate pivotally attached to said inner wall for engagement with said mechanism, said detent plate having an undulated portion for engaging indexing means on said mechanism to index said mechanism in a plurality of positions, a flange extending outwardly from said detent plate for limiting the pivotal movement of said detent plate and a helical spring positioned between said detent plate and said cover plate to yieldingly urge said detent plate into engagement with said indexing means, said spring having one end receiving said projection.

12. In a vehicle direction signaling device, a housing having oppositely disposed openings therein and provided with oppositely disposed guiding projections extending inwardly from said housing walls, said housing being adapted to support a switch operating mechanism therein and a cover subassembly positioned in one of said openings, said subassembly comprising a cover plate having a plurality of spaced supporting columns extending therefrom into said housing, and a unitary switch assembly positioned in the space between said columns with its operating arm extending outwardly therefrom into a position for engagement with said mechanism to operate said switch, said switch having a flange at each end thereof engaging the ends of said columns for supporting said switch on said columns, each of said flanges having a slot receiving one of said projections to restrict lateral movement of said switch in said housing.

13. In a vehicle direction signaling device, a housing having oppositely disposed openings therein and provided with oppositely disposed guiding projections extending inwardly from said housing walls, said housing being adapted to support a switch operating mechanism therein, a first cover subassembly positioned in one of said openings, said cover assembly comprising a cover plate having a plurality of spaced supporting columns extending therefrom into said housing and a unitary switch assembly positioned in the space between said columns with its operating arm extending outwardly therefrom into a position for engagement with said mechanism to operate said switch, said switch having a flange at each end thereof engaging the ends of said columns for supporting said switch on said columns, each of said flanges having a slot receiving one of said projections to restrict lateral movement of said switch in said housing, and a second cover subassembly positioned in the other of said openings, said second cover assembly comprising a cover plate having a projection extending from the inner wall thereof, a detent plate pivotally attached to said inner wall for engagement with said mechanism, said detent plate having an undulated portion for engaging indexing means on said mechanism to index said mechanism in a plurality of positions, a flange extending outwardly from said detent plate for limiting the pivotal movement of said detent plate and a helical spring positioned between said detent plate and said cover plate to yieldingly urge said detent plate into engagement with said indexing means, said spring having one end receiving said projection.

EDWARD L. BARCUS.

REFERENCES CITED

The following references are of record in the file of this patent:

UNITED STATES PATENTS

| Number | Name | Date |
|---|---|---|
| 1,928,315 | Martin | Sept. 26, 1933 |
| 2,276,413 | Moore | Mar. 17, 1942 |
| 2,280,110 | Weien | July 21, 1942 |
| 2,284,936 | Wilshusen | June 2, 1942 |
| 2,291,141 | Breeze | July 28, 1942 |
| 2,308,108 | Roedding | Jan. 12, 1943 |